United States Patent

[11] 3,547,465

[72] Inventors Hans-Juergen Hoffmann
Hohenlimburg;
Manfred Loehr, Letmathe, Germany
[21] Appl. No. 765,173
[22] Filed Oct. 4, 1968
[45] Patented Dec. 15, 1970
[73] Assignee Hoesch Aktiengesellschaft
Dortmund, Germany
[32] Priority Oct. 9, 1967
[33] Germany
[31] No. 1,630,058

[54] HYDROPNEUMATIC SUSPENSION UNIT FOR USE IN VEHICLES OR THE LIKE
16 Claims, 3 Drawing Figs.

[52] U.S. Cl. .................................................. 280/124;
267/64
[51] Int. Cl. ...................................................... B60g 15/08
[50] Field of Search .......................................... 280/124
(F); 267/64

[56] References Cited
UNITED STATES PATENTS
3,110,485 11/1963 Axthammer.................. 267/64
3,094,317 6/1963 Axthammer.................. 267/64
3,141,659 7/1964 Lyon ............................ 280/124F

*Primary Examiner*—Philip Goodman
*Attorney*—Michael S. Striker

ABSTRACT: A vibration damper or suspension unit wherein a liquid-filled cylinder accommodates a piston having a hollow piston rod and provided with damping valves which throttle the flow of liquid between the working chambers of the cylinder when the piston leaves its neutral position. One of the working chambers communicates with a compartment wherein the liquid is stressed by an elastic compensating device including a supply of entrapped gas. The piston rod accommodates regulating members including two pipes and a valve and is connected with externally mounted liquid-filled high-pressure and low-pressure chambers. The high-pressure chamber admits highly compressed liquid into the one working chamber when the piston leaves its neutral position in a direction to retract the piston rod into the cylinder, and the one working chamber admits liquid into the low-pressure chamber when the piston leaves its neutral position by moving in the opposite direction.

3,547,465

HYDROPNEUMATIC SUSPENSION UNIT FOR USE IN VEHICLES OR THE LIKE

BACKGROUND OF THE INVENTION

The present invention relates to hydropneumatic vibration dampers for use in automotive vehicles or the like.

Presently known pneumatic or hydropneumatic dampers or suspension units are normally provided with level detectors and delay units which contribute to the initial and maintenance cost and to the bulk of such dampers. Moreover, the means for actuating the detectors and/or delay units often include wires, cables, linkages, universal joints and/or other mechanical assemblies which are prone to malfunction. Additional problems arise in connection with maintenance of a requisite working pressure in normal condition of the damper, namely, in that position of the piston which the latter assumes following a lengthening or shortening due to relative movement of parts which are coupled to each other by the damper. Proper selection of gaskets and other sealing elements plays an important role in maintenance of desired working pressure. Slidable sealing elements are subjected to considerable wear, and such wear increases when a sealing element moves back and forth along edges which surround a bore, port, recess or the like in the surface which is surrounded by the sealing element, for example, in the peripheral surface of a cylinder or piston rod. Attempts to avoid the necessity for frequent replacement of worn sealing elements include the provision of pistons and like movable parts which are machined to extremely close tolerances so as to prevent excessive leakage along the surfaces which guide the movable parts. This proposal is not entirely satisfactory due to the much higher cost of precision-finished parts. Furthermore, a piston which is a tight fit in a cylinder or sleeve must have a considerable axial length in order to insure satisfactory guidance during axial movement. This contributes to the overall length of the damper.

SUMMARY OF THE INVENTION

It is an object of the present invention to provide an externally energized vibration damper or suspension unit for use in vehicles or the like wherein the sealing means which maintain the desired working pressure in normal condition of the damper are subjected to minimal wear.

Another object of the invention is to provide the damper with novel levelling means which performs additional important functions, particularly that of delaying the reaction of movable parts to external stresses which tend to shorten or lengthen the damper.

A further object of the invention is to provide a vibration damper which can be readily installed in existing vehicles to replace conventional dampers without necessitating appreciable or costly alterations of such vehicles.

An additional object of the invention is to provide a vibration damper which can be utilized as a shock absorber in combination with or as a substitute for steel springs.

A concomitant object of the invention is to provide a vibration damper wherein the levelling means and other essential parts occupy little room.

The invention is embodied in a hydropneumatic vibration damper or suspension unit which is particularly suited for use in automotive vehicles and can be installed between a wheel axle and the frame or chassis of a vehicle. The damper comprises a liquid-filled cylinder, a piston which is reciprocable in and divides the interior of the cylinder into a pair of working chambers, damping valves provided in the piston to retard the flow of liquid between the working chambers in response to movement between the piston and cylinder, elastic compensating means preferably including a supply of compressed gas provided in a housing which accommodates the cylinder and defines a liquid-filled compartment which communicates with one of the working chambers and is sealed from the supply of gas by an elastic diaphragm or an analogous deformable partition, a hollow piston rod connected with the piston and extending from the cylinder through the other working chamber, liquid-filled low-pressure and high-pressure chambers mounted externally of the cylinder and connected with the piston rod, and regulating means including relatively movable regulating members provided in and cooperating with the piston rod to return the piston to a neutral position with reference to the cylinder and to damp the movement of the piston in response to external stresses tending to move the piston from neutral position. Such regulating members can permit flow of liquid from the high-pressure chamber into the one working chamber when the piston leaves its neutral position in a direction to effect a retraction of the piston rod into the cylinder. When the piston leaves its neutral position in the opposite direction, the one working chamber is connected with the low-pressure chamber.

The communication between the one working chamber and the high-pressure or low-pressure chamber is terminated when the damper levels itself off, i.e., when the piston returns to neutral position.

The novel features which are considered as characteristic of the invention are set forth in particular in the appended claims. The improved damper itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
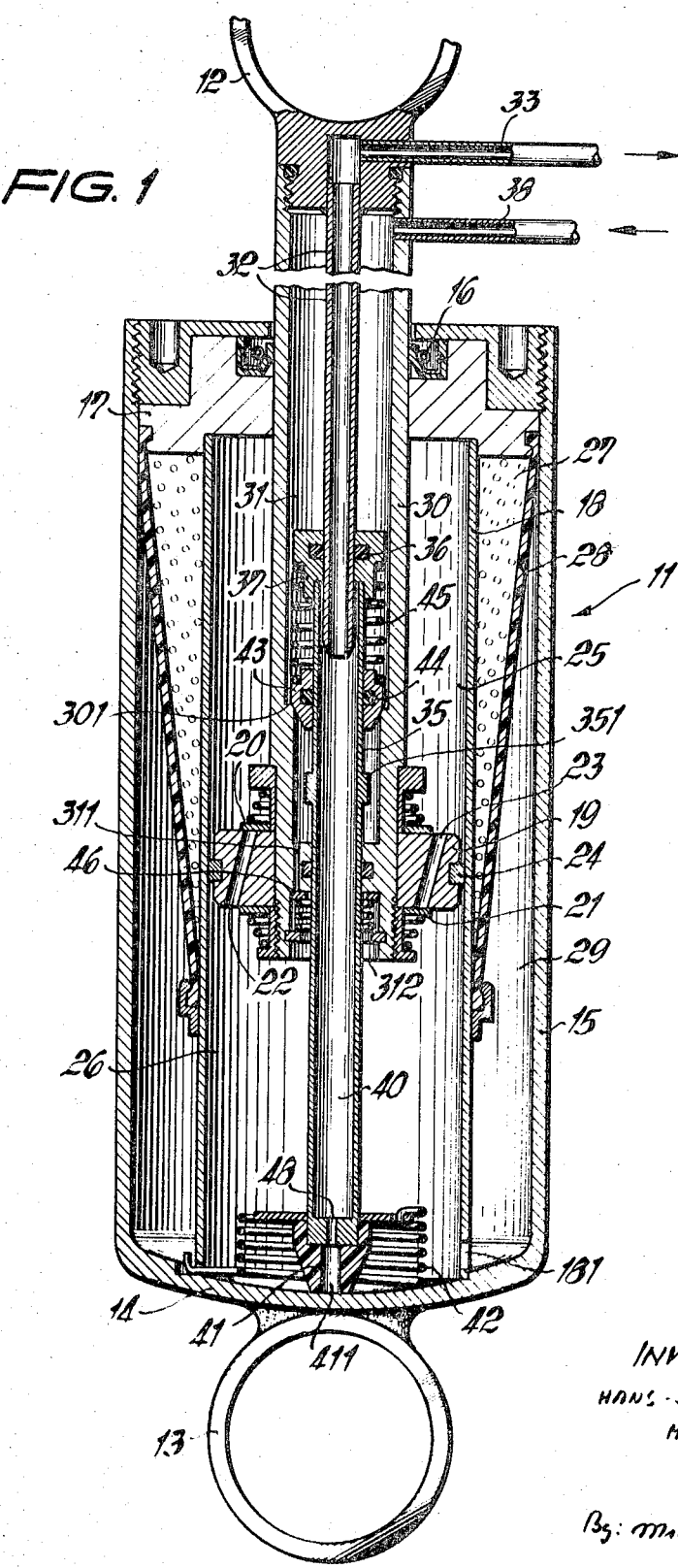
FIG. 1 is an axial sectional view of a spring unit in a vibration damper which embodies the invention, the piston of the spring unit being shown in neutral position.

The damper or suspension device of the present invention includes a spring unit 11 having an upper coupling member 12 which can be articulately secured to the frame and a lower coupling member 13 which can be attached to the wheel axle of a vehicle, not shown. The lower coupling member 13 is rigid with the bottom wall 14 of an outer cylinder or housing 15 having an upper end which accommodates a cover 17 provided with an annular sealing element 16 for a piston rod 30. The bottom wall 14 supports the lower end of a liquid-filled inner cylinder or working cylinder 18 whose upper end is mounted in the cover 17. The cylinder 18 accommodates a reciprocable piston 19 which is rigid with the aforementioned piston rod 30. The piston 19 has an external circumferential groove for a piston ring 24. In addition, the piston 19 carries two damping valves 20, 21 which normally close channels 22, 23. Each of these valves includes an annular plate which is biased against the adjoining end of the respective channel by a helical valve spring. The piston 19 and its ring 24 divide the interior of the inner cylinder 18 into an upper working chamber 25 which surrounds the piston rod 30 and a lower working chamber 26 extending downwardly to the bottom wall 14. An elastic compensating assembly is provided in the space between the housing 15 and cylinder 18. This compensating assembly comprises a supply of gas which is entrapped in a first compartment 27 adjacent to a supply of oil or other suitable liquid in a second compartment 29. The two compartments are sealed from each other by an annular diaphragm 28 of the compensating assembly. The upper end of the diaphragm 28 is clamped between the housing 15 and cover 17 and its lower end is clamped to the periphery of the cylinder 18. The latter has a port 181 which permits oil to flow between the compartment 29 and the lower working chamber 26.

The piston rod 30 is guided by and is slidable with reference to the cover 17, and its upper end is rigid with the coupling member 12. The coupling member 12 also serves as a means for sealing the upper end of the bore 31 in the piston rod 30 and it carries a first regulating pipe 32 which extends axially downwardly into the bore 31 and communicates with a conduit 33, the latter serving to connect the interior of the regulating pipe 32 with an external low-pressure chamber 34 (see FIG. 3).

The lower end portion of the pipe 32 extends into the upper end of a second regulating pipe 35 which extends from below into the piston rod 30 and is movable up and down with reference to the cylinder 18. A gasket 36 which surrounds the pipe 32 is installed in an annular guide member or head 37 which is applied over the upper end portion of the pipe 35 and separates the bore 40 of the pipe 35 from the bore 31 of the piston rod 30. The bore 31 is connected with an externally mounted high-pressure chamber 39 (FIG. 3) by a conduit 38. The bore 40 communicates with the interior of the pipe 32 and hence with the low-pressure chamber 34 of FIG. 3. The lower end portion of the pipe 35 carries a sealing nipple 41 provided with an axial orifice 411 the lower end of which is sealed by the bottom wall 14 of the housing 15 when the pipe 35 assumes the axial position shown in FIG. 1. A prestressed helical spring 42 operates between the nozzle 41 and bottom wall 14 and tends to move the pipe 35 downwardly. The spring 42 is assisted by the pressure differential between the working chamber 26 and the bore 31 of the piston rod 30 so that the pipe 35 is held in the position of FIG. 1 in normal or neutral position of the piston 19 as well as when the spring unit is being shortened in that the distance between the coupling members 12, 13 decreases.

A regulating valve 43 is installed in the bore 31 of the piston rod 30 and is provided with a sealing ring 44 which surrounds the pipe 35. When the spring unit 11 assumes the normal condition shown in FIG. 1, the regulating valve 43 bears against an annular seat 301 in the bore 31 of the piston rod 30. The regulating valve 43 is held in such sealing position by a helical valve spring 45 and by the pressure in the bore 31.

Figure 2:
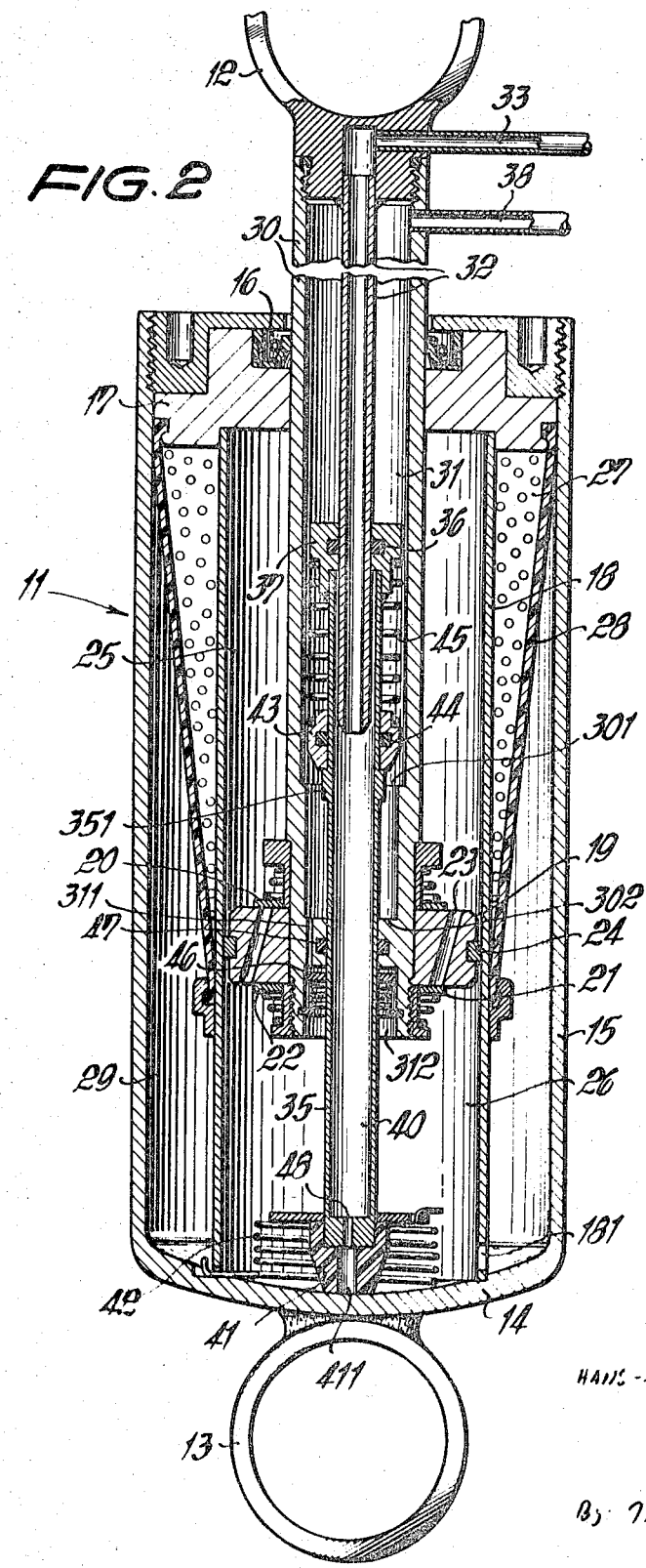
FIG. 2 is a similar axial sectional view but showing the piston in a different position corresponding to a shortening of the spring unit.

When the vehicle is loaded so that the frame descends toward the axle (i.e., when the coupling member 12 moves downwardly toward the coupling member 13), the piston rod 30 moves the piston 19 to the position shown in FIG. 2 and the regulating valve 43 is opened by a motion transmitting collar 351 of the pipe 35. Thus, the valve 43 moves away from the seat 301 and permits oil to flow from the high-pressure chamber 39 of FIG. 3, through the conduit 38, bore 31, a flow restrictor 311 in the lower portion of the piston rod 30, a one-way check valve 46 which normally seals the lower end of the restrictor 311 and is installed in a counterbore 312 machined into the lower end face of the piston rod, and into the working chamber 26. The restrictor 311 delays or brakes inward movement of the piston rod 30 so that, when the regulating valve 43 opens for a short period of time (for example, when the wheels of the vehicle travel over potholes or in a curve), the overall length of the spring unit 11 changes very little or not at all.

The adjustment is completed when the piston rod 30 moves with the piston 19 outwardly to the extent necessary to move the seat 301 back into sealing engagement with the regulating valve 43. The valve 46 and the sealing element 47 in the piston rod 30 are necessary for the event that the pressure of gas in the compartment 27 rises to equal that in the high-pressure chamber 39, for example, in response to repeated extension and contraction of the spring unit 11. In the event of such equilibrium between the pressures in chamber 39 and compartment 27, and with the piston rod 30 in its inner end position, the frame of the vehicle would rest on the cushions of gas in the compartment 27 and in the compartment 39a which pressurizes the liquid in the chamber 39 of FIG. 3. This would result in a very flat characteristic curve of the spring unit. The parts 46, 47 insure that the frame of the vehicle then rests solely on the cushion of gas in the compartment 27. The liquid in the chamber 34 is pressurized by compressed gas which is entrapped in a compartment 34a. The compartments 34a, 39a are respectively sealed from the chambers 34, 39 by elastic diaphragms 34b, 39b or analogous deformable partitions.

Figure 3:
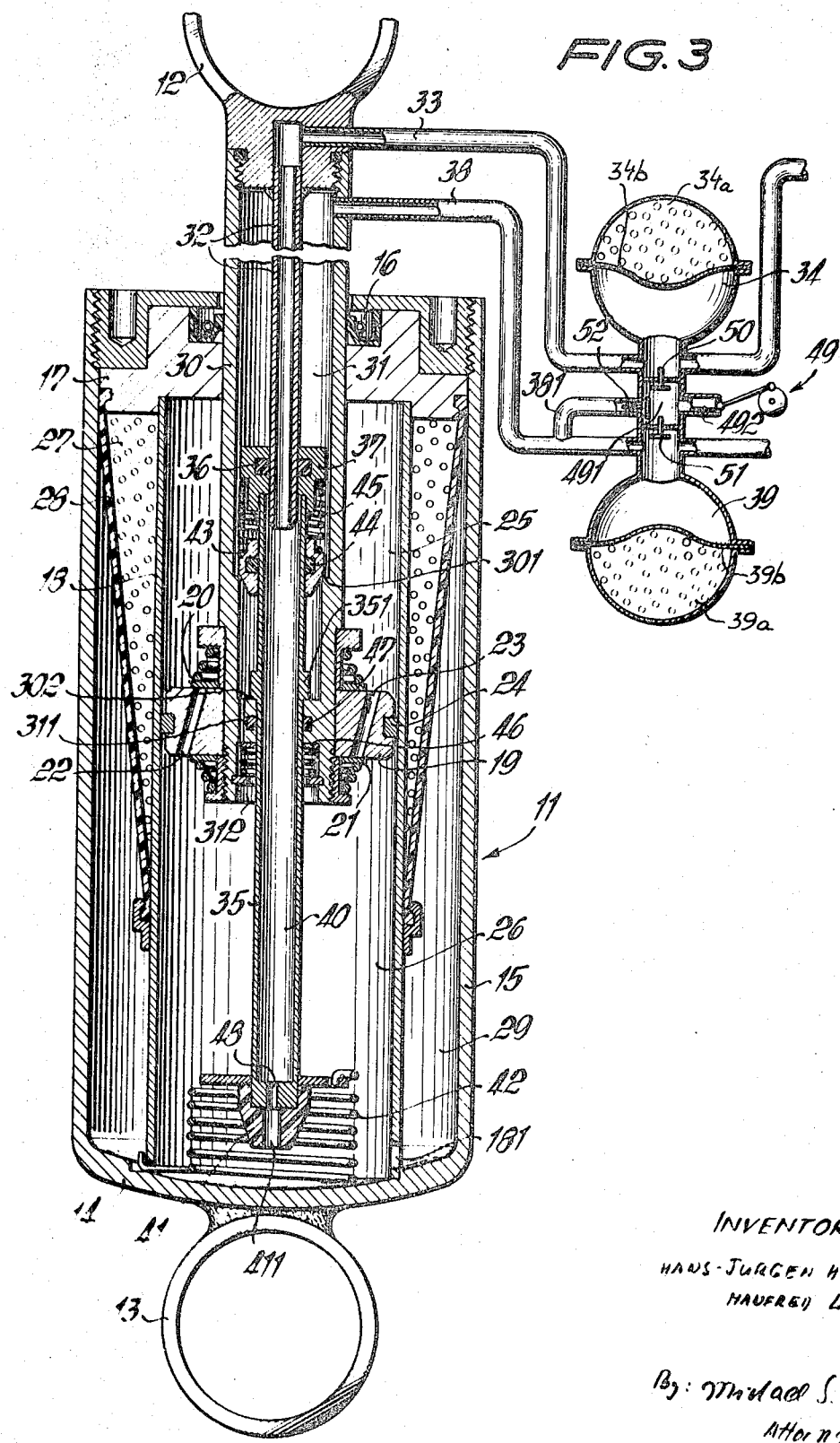
FIG. 3 is an axial sectional view of the entire damper, the piston rod of the spring unit being shown in extended position.

When the load carried by the frame of the vehicle is reduced, the piston rod 30 moves outwardly and the collar 351 of the pipe 35 is moved upwardly by an internal shoulder 302 of the piston rod. This is shown in FIG. 3. The nipple 41 is then moved away from sealing engagement with the bottom wall 14 of the housing 15 and the liquid can flow from the working chamber 26, by way of the orifice 411, a flow restrictor 48 in the lower end portion of the pipe 35, and into the bore 40. Such liquid flows upwardly through the pipe 32, conduit 33 and into the low-pressure chamber 34. The adjustment is terminated when the piston rod 30 reassumes an axial position in which the nipple 41 engages the bottom wall 14 of the housing 15.

In order to return the liquid from the chamber 34 into the chamber 39, the damper comprises a pump 49 (FIG. 3) which forces the liquid to flow from the chamber 34 through a first one-way valve 50, into a pumping chamber 491, through a second one-say valve 51 and into the chamber 39. A relief valve 52 is installed in a branch 381 of the conduit 38 to prevent the pressure of liquid in the bore 31 of the piston rod 30 from rising above a predetermined maximum value. The pump 49 can be driven by an engine or by an electric motor which is started and arrested automatically, for example, in response to predetermined differentials between fluid pressure in the chambers 34 and 39. The automatic control system for such a motor may include two pressure-responsive switches which are installed in the chambers 34, 39 and one of which starts the motor when the pressure in the chamber drops to a predetermined minimum value whereas the other arrests the motor when the pressure in the chamber 34 decreases to a predetermined minimum value.

It is also possible to install the chambers 34, 39 on the frame of the vehicle and to couple the plunger 492 of the pump 49 with the axle by way of a connecting rod or the like so that relative movements between the frame and the axle (i.e., relative movements between the coupling members 12, 13) cause the liquid to flow from the chamber 34 into the chamber 39.

Without further analysis, the foregoing will so fully reveal the gist of the present invention that others can, by applying current knowledge, readily adapt it for various applications without omitting features which fairly constitute essential characteristics of the generic and specific aspects of out contribution to the art.

We claim:

1. A hydropneumatic suspension unit, particularly for use in automotive vehicles, comprising a liquid- filled cylinder; a piston reciprocable in and dividing the interior of said cylinder into a pair of working chambers; damping valves provided in said piston to retard the flow of liquid between said working chambers in response to movement between said cylinder and said piston; elastic compensating means; means defining a liquid- filled compartment in communication with one of said working chambers and adjoining said compensating means to stress the latter as a function of fluid pressure in said one working chamber; a hollow pisto piston rod connected with said piston and extending from said cylinder through the other working chamber; liquid- filled low- pressure and high- pressure chambers connected with said piston rod; and regulating means including relatively movable regulating members provided in and cooperating with said piston rod to return said piston to a neutral position with reference to said cylinder and to damp the movement of said piston in response to external stresses e tending to move the latter from neutral position.

We claim:

1. A hydropneumatic suspension unit, particularly for use in automotive vehicles, comprising a liquid-filled cylinder; a piston reciprocable in and dividing the interior of said cylinder into a pair of working chambers; damping valves provided in said piston to retard the flow of liquid between said working chambers in response to movement between said cylinder and said piston; elastic compensating means; means defining a liquid-filled compartment in communication with one of said working chambers and adjoining said compensating means to stress the latter as a function of fluid pressure in said one working chamber; a hollow piston rod connected with said piston and extending from said cylinder through the other working chamber; liquid-filled low-pressure and high-pressure chambers connected with said piston rod; and regulating means including relatively movable regulating members provided in and cooperating with said piston rod to return said piston to a neutral position with reference to said cylinder and to damp the movement of said piston in response to external stresses tending to move the latter from neutral position.

2. A unit as defined in claim 1, wherein said regulating means comprises a regulating valve.

3. A unit as defined in claim 1, wherein said piston rod is provided with a bore which is in communication with said high-pressure chamber means and has a closed end, said regulating means comprising a first pipe in communication with said low-pressure chamber means and accommodated in said bore and a second pipe extending axially into said bore and slidably guided by said first pipe.

4. A unit as defined in claim 3, further comprising first and second conduit means respectively connecting said high-pressure and said low-pressure chamber means with said piston rod and said first pipe.

5. A unit as defined in claim 3, wherein said second pipe comprises a first end portion provided with a guide member having a sealing element surrounding said first pipe and a second end portion provided with a nipple having an orifice adapted to establish communication between said one working chamber and the interior of said pipes.

6. A unit as defined in claim 5, wherein said regulating means further comprises a regulating valve slidably surrounding said second pipe and arranged to seal said bore from said one working chamber in the neutral position of said piston.

7. A unit as defined in claim 6, wherein said second pipe is provided with means for moving said regulating valve away from sealing position in response to relative movement between said second pipe and said piston rod.

8. A unit as defined in claim 7, wherein said piston rod is provided with an internal seat for said regulating valve and further comprising resilient means operating between said guide means and said regulating valve to bias the latter against said seat.

9. A unit as defined in claim 1, wherein said piston rod is provided with restrictor means for throttling the flow of liquid between said high-pressure chamber means and said one working chamber, and further comprising one-way valve means for normally sealing said restrictor means and arranged to permit flow of liquid from said high-pressure chamber means in response to movement of said piston in a direction to reduce the volume of said one working chamber.

10. A unit as defined in claim 9, wherein said one-way valve means is installed in a recess provided therefor in said piston rod.

11. A unit as defined in claim 1, wherein said regulating means comprises a pipe having a first end portion provided with a flow restrictor sealed from said one working chamber in the neutral position of said piston and a second end portion extending into said piston rod and communicating with said low-pressure chamber means, said piston rod being arranged to unseal said restrictor in response to movement of said piston away from neutral position to thus permit flow of liquid from said one working chamber into said low-pressure chamber means.

12. A unit as defined in claim 11, further comprising means for biasing said restrictor to sealing position.

13. A unit as defined in claim 1, wherein said regulating means is arranged to establish communication between said low-pressure chamber means and said one working chamber in response to movement of said piston from neutral position in a direction to increase the volume of said one working chamber.

14. A unit as defined in claim 13, wherein said regulating means is arranged to establish communication between said high-pressure chamber means and said one working chamber in response to movement of said piston from neutral position in a direction to reduce the volume of said one working chamber.

15. A hydropneumatic unit as defined in claim 1 for use in automotive vehicles of the type having an axle member and a frame member wherein at least one said last mentioned members is movable with reference to the other last mentioned member and wherein one of said last mentioned members is coupled to said cylinder and the other of said last mentioned members is coupled to said piston rod, and further comprising pump means arranged to convey liquid from said low-pressure chamber into said high-pressure chamber in response to movement of said one last mentioned member with reference to said other last mentioned member.

16. A hydropneumatic suspension unit movable between a neutral position and a retracted position or an extended position, particularly for use in automotive vehicles, comprising a liquid-filled cylinder; a piston reciprocable in and dividing the interior of said cylinder into a pair of working chambers; damping valves provided in said piston to retard the flow of liquid between said working chambers in response to movement between said cylinder and said piston; elastic compensating means; means defining a liquid-filled compartment in communication with one of said working chambers and adjoining said compensating means to stress the latter as a function of fluid pressure in said one working chamber; a hollow piston rod connected with said piston and extending from said cylinder through the other working chamber; external liquid-filled low-pressure and high-pressure chambers located outside said cylinder and connected with said hollow piston rod; and regulating means including relatively movable regulating members provided at least in part in said hollow piston rod and cooperating with the latter and with each other to connect said one working chamber with said external high-pressure chamber during movement of said unit to said retracted position and to connect said one working chamber to said external low-pressure chamber during movement of said unit to said extended position to thus return said unit to neutral position whenever it is moved from the latter by external forces.